United States Patent
Lu et al.

(10) Patent No.: US 8,379,816 B1
(45) Date of Patent: Feb. 19, 2013

(54) METHODS AND ARRANGEMENT FOR HANDLING PHISHING CALLS FOR TELECOMMUNICATION-ENABLED DEVICES

(75) Inventors: Kun Lu, Najing (CN); Yi Cai, Nanjing (CN); Shiyu Xie, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 1087 days.

(21) Appl. No.: 12/121,717

(22) Filed: May 15, 2008

(51) Int. Cl.
*H04M 1/56* (2006.01)

(52) U.S. Cl. .......... 379/142.01; 379/142.02; 379/142.03; 379/142.04; 379/142.05; 379/142.06

(58) Field of Classification Search ............. 379/142.05, 379/88.21, 215, 142.01, 212.01; 709/203, 709/206, 224
See application file for complete search history.

(56) References Cited

U.S. PATENT DOCUMENTS

| | | | |
|---|---|---|---|
| 2007/0140445 A1* | 6/2007 | Ito | 379/88.21 |
| 2008/0181380 A1* | 7/2008 | Gustave et al. | 379/142.05 |
| 2009/0003568 A1* | 1/2009 | Koretsky | 379/142.01 |
| 2009/0116630 A1* | 5/2009 | O'Sullivan et al. | 379/142.05 |
| 2009/0161855 A1* | 6/2009 | Emerson et al. | 379/212.01 |
| 2010/0142696 A1* | 6/2010 | Zhou et al. | 379/215.01 |

* cited by examiner

*Primary Examiner* — Joseph J Nguyen
(74) *Attorney, Agent, or Firm* — IPSG, P.C. Intellectual Property Law

(57) ABSTRACT

A method for managing a phishing call is provided. The method includes receiving an incoming telecommunication request. The method also includes comparing a unique identification associated with the incoming telecommunication request against a set of contact lists. The method further includes, if the unique identification is not found on the set of contact lists, activating a delay timer to prevent a set of user notification components from being triggered for a delay period. The method yet also includes performing a connection analysis to determine status of the incoming telecommunication request. The method moreover includes, if the incoming telecommunication request is terminated during the delay period, updating a phishing call log with data about the incoming telecommunication request, wherein the updating of the phishing call log occurs without the set of user notification components being triggered, responsive to the incoming telecommunication request, during or subsequent to the updating.

17 Claims, 3 Drawing Sheets

METHODS AND ARRANGEMENT FOR HANDLING PHISHING CALLS FOR TELECOMMUNICATION-ENABLED DEVICES

BACKGROUND OF THE INVENTION

The growth in the telecommunication industry has facilitated communication between parties geographically dispersed. Since most individuals have a desire to develop and maintain relationships, telecommunication devices (e.g., mobile telephone, landline telephone, smart devices, internet protocol telephone, voice-over internet protocol telephone, and the like) have become essential everyday tools. As a result, telecommunication behaviors have developed and evolved.

Consider the situation wherein, for example, a telecommunication request, such as a telephone call, is received. Usually, the recipient may unconsciously wait a few seconds before responding to the incoming telephone call. In an example, the recipient may not pick up the telecommunication device, such as the telephone, until the third ring. If by chance the recipient misses the call, such as the telephone stops ringing before the recipient is able to respond or the recipient is unavailable to respond to the telephone call, the recipient may call the missed number, as a courtesy. In many instances, the recipient may return the missed call even if the recipient is unfamiliar with the telephone number associated with the missed call.

In recent years, a practice, known as phishing, has emerged that has taken advantage of the telecommunication behaviors that have developed and essentially have become second-natured to many individuals. Given the telecommunication behaviors that have evolved, most phishing calls have been configured to ring for a shorter duration than an average incoming telecommunication request (e.g., telephone call). In an example, if an average person does not respond to an incoming telephone call until the third rings, the phishing call may be set to ring twice. In other words, a phishing call is usually timed to prevent a recipient from being able to respond to an incoming telephone call. By limiting the duration of the ringing, the phisher may be able to "lay the trap" without incurring an expensive telecommunication cost. In other words, if a connection is not made, the phisher's telecommunication cost may be minimal or even none.

The phisher is usually able to take advantage of a recipient of an incoming telecommunication request (e.g., telephone call) by relying on the telecommunication behaviors that have become an ingrained habit for many telecommunication device users. In other words, most recipients of missed calls may make a courtesy call to determine the identity associated with the missed calls. Unfortunately, some of the missed calls may be phishing calls. A phishing call is usually an incoming telecommunication request (e.g., telephone call) that may be made to lure unsuspecting victims. Most phishing calls have the purpose of creating a financial scam. For ease of discussion, the recipient of a phishing call is herein known as a phishing injured party.

In an example, the phishing injured party may call the telephone number associated with the missed call. Unbeknownst to the phishing injured party, the missed call is associated with a toll number. As a result, the phishing injured party may be charged with an extravagant toll charge when the connection is made with the phished number (i.e., telephone number associated with the phishing call). Additionally or alternatively, a phishing call may create a financial fantasy, such as winning a prize, that may require the phishing injured party to "contribute" money and/or personal data to facilitate the processing. Unfortunately, the financial scam usually results in the phishing injured party suffering financial losses. In an example, the phishing injured party may never receive the prize or if an item is received, the item is usually of insignificant value. In addition, the personal data that the phishing injured party may have provided may be utilized fraudulently by the phisher, such as to apply for a credit card. As can be appreciated from the foregoing, the purpose of the phishing call is usually to take financial advantage of the unsuspecting victim.

To address potential phishing calls, a filtering method utilizing a black list may be implemented. A black list usually requires the identification of specific telephone numbers that a user may want to filter. In other words, if the telephone number is on the black list, telephone call associated with the specific number is filtered and prevented from making connection with the user's telecommunication device. Consequently, any number not listed may be provided access to the telecommunication device. Therefore, to be an effective black list, the black list may have to be maintained and constantly updated.

However, the ability to maintain the black list is not a simple task. Since the telephone numbers that a phisher may utilize may vary, especially since telephone numbers may be easily and cheaply acquired, most users are not equipped to maintain and update a black list that is proned to change. Ideally, if all phishing numbers are identifiable, the memory requirement to store all potential phishing numbers may require the telecommunication device to have a fairly large memory storage space. In addition, the ability for the telecommunication device to compare the telephone number associated with an incoming telecommunication request against all possible phishing numbers may require time and processing power that may cause great inconvenience to the user of the telecommunication device. Due to at least the aforementioned limitations, the black list filtering method usually has a low detection rate.

Another method that may be implemented to address phishing calls is the utilization of a filtering method associated with a white list. As discussed herein, a white list refers to a database/list that may store contact information, such as an address book. The white list is usually associated with a specific telecommunication device and may be internally stored on the telecommunication device or a memory card associated with the telecommunication device. Consider the situation wherein, for example, an incoming telecommunication request is received. The telephone number associated with the incoming telecommunication request (e.g., telephone call) may be compared against a white list. If the telephone number associated with the incoming telecommunication request is not on the white list, the incoming telecommunication request may be filtered and discarded.

Similar to the black list, a white list required the user of the white list to maintain and update the white list. Thus, if a friend has recently changed his telephone number, for example, incoming telecommunication requests (e.g., telephone calls) from the friend may be blocked if the user of the telecommunication device has forgotten to update his white list. Since the incoming telecommunication request is filtered and discarded, the user may not realize that his friend is trying to contact him, especially since details about a blocked incoming telecommunication request is usually not saved. Even if details about the telecommunication request are saved, the saved data are usually not easily retrievable by an average user of a telecommunication device.

In another example, an incoming telecommunication request from a public telephone may be a valid telephone call from the recipient's sister. Since the user is unlikely to have the telephone number associated with the public telephone listed on his white list, the incoming telecommunication request from the public telephone is also filtered and discarded. Due to the limitation of the white list, many actual valid telecommunication requests may be unnecessarily blocked. As a result, the white list filtering method may cause a high false positive.

As can be appreciated from the foregoing, both filtering methods require maintenance of lists that may be a challenge to maintain and update. Since both filtering methods identify potential phishing calls based on an ongoing 'updated list", the incompleteness of each list may cause the filtering method to be either too restrictive (as in the example of the white list filtering method) or too lax (as in the example of the black list filtering method). Thus, both filtering methods do not provide a complete solution of enabling telecommunication while protecting users of telecommunication devices from potential phishing calls.

BRIEF SUMMARY OF THE INVENTION

The invention relates, in an embodiment, to a method for managing a phishing call. The method includes receiving an incoming telecommunication request. The method also includes comparing a unique identification associated with the incoming telecommunication request against a set of contact lists. The method further includes, if the unique identification is not found on the set of contact lists, activating a delay timer, which is configured to prevent a set of user notification components from being triggered for a delay period. The method yet also includes performing a connection analysis to determine status of the incoming telecommunication request. The method moreover includes, if the incoming telecommunication request is terminated during the delay period, updating a phishing call log with data about the incoming telecommunication request, wherein the updating of the phishing call log occurs without the set of user notification components being triggered, responsive to the incoming telecommunication request, during or subsequent to the updating.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
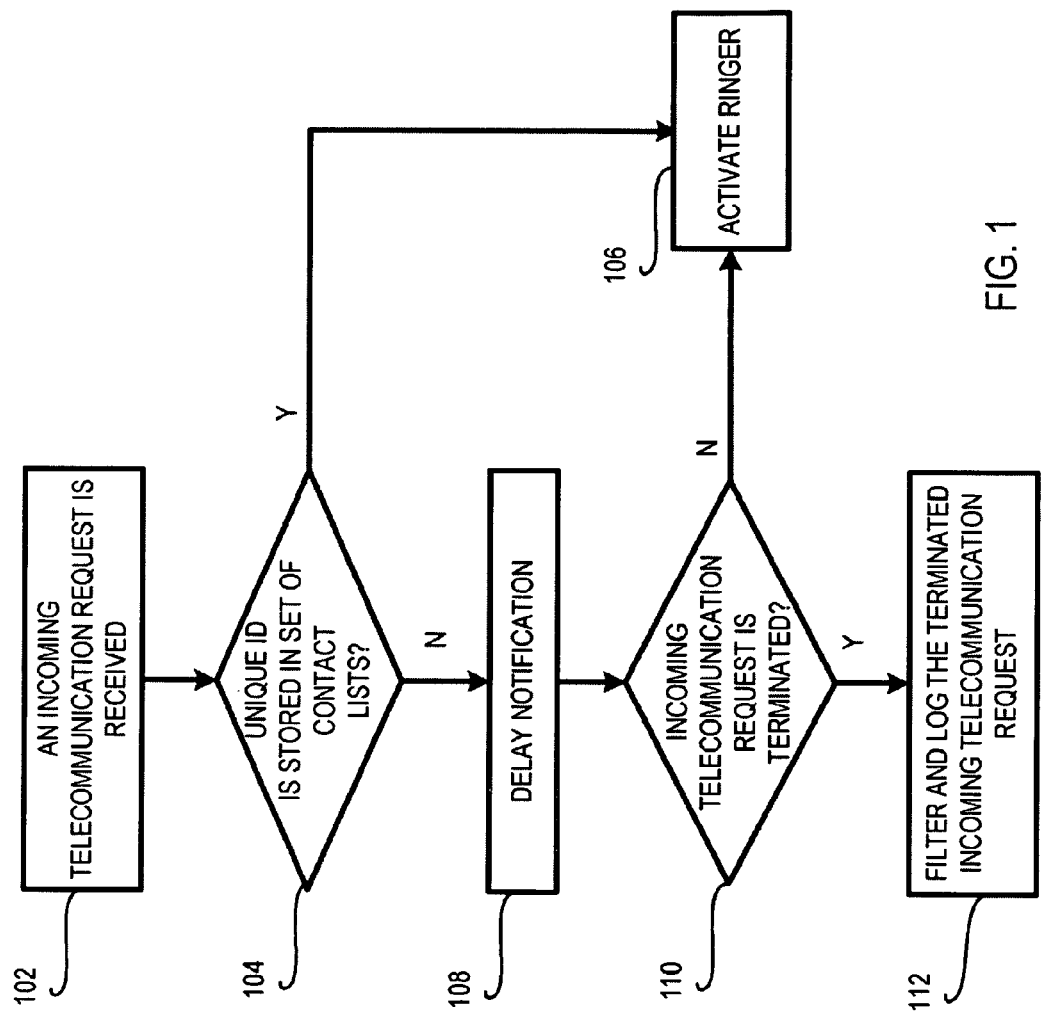
FIG. 1 shows, in an embodiment of the invention, a simple flowchart illustrating a simple phishing call filtering method for managing potential phishing calls.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, most phishing calls tend to share a common characteristic in that most phishing calls tend to ring for a short duration in order to prevent the recipient of the incoming telecommunication requests (e.g., telephone calls) from being able to respond to the incoming telecommunication requests (e.g., pick up the telephone). In one aspect of the invention, the inventors herein realized that this characteristic may be utilized to identify a phishing call. In accordance with embodiments of the invention, methods and arrangement are provided for identifying a phishing call by analyzing the duration of the incoming telecommunication request.

As can be appreciated from the foregoing, devices that may conduct a telecommunication session are no longer limited to telephones. In an example, telecommunication may be conducted via smart devices. In another example, telecommunication may be conducted between computer-enabled devices. To facilitate discussion, devices that are capable of enabling telecommunication are herein known as telecommunication-enabled devices.

In addition, various implementations may be discussed using terminologies such as telephone, telephone call, ringer, telephone number, and the like. The usage of these terminologies is not meant as a limitation to the invention. Instead, the discussions and the terminologies are meant as examples and the invention is not limited by the examples presented.

In an embodiment, the methods and arrangement include employing a phishing call filtering module to compare the unique identification (e.g., telephone number) associated with an incoming telecommunication request (e.g., telephone call) against a contact list (e.g., address book). If the incoming unique identification is stored on the contact list, the incoming telecommunication request is treated as a typical incoming telecommunication request (e.g., telephone call). In other words, the user of the telecommunication-enabled device is notified of the incoming telecommunication request. In an example, the ringer of the telephone may be activated.

However, if the unique identification associated with the incoming telecommunication request is not stored on the contact list, a silent delay period may be activated thereby preventing the user of the telecommunication-enabled device (e.g., mobile telephone, landline telephone, smart devices, computer, internet protocol telephone, voice-over internet protocol telephone, and the like) from being aware of an incoming telecommunication request. In an example, the ringer is not activated. In another example, the caller ID feature may also be deactivated during the silent delay period.

After the pre-determined silent delay period has expired (e.g., after 2 seconds, for example), the phishing call filtering module may check the status of the incoming telecommunication request. If the communication channel is still active, the phishing call filtering module may notify the user of the telecommunication-enabled device of the incoming telecommunication request. In an example, the telephone ringer and/or the caller ID feature may be activated. In other words, since the incoming telecommunication request is still connected after the silent delay period, the incoming telecommunication request is considered as a valid telecommunication request.

However, if the communication channel established to enable the incoming telecommunication request has been terminated, the incoming telecommunication request may be logged as a potential phishing call, in an embodiment. Additionally, the user of the telecommunication-enabled device is not notified of the potential phishing call, in an embodiment. In an example, the telephone ringer is not activated, the caller ID feature is not displayed, and the potential phishing call is not displayed as a missed call. In another embodiment, the user of the telecommunication-enabled device may be notified each time the phishing call log is updated. As can be appreciated from the foregoing, the accessibility of the phishing call log enables the user of the telecommunication-enabled device to review the details of the potential phishing calls at his convenience.

The features and advantages of the present invention may be better understood with reference to the figures and discussions that follow.

FIG. 1 shows, in an embodiment of the invention, a simple flowchart illustrating a simple phishing call filtering method for managing potential phishing calls.

At a first step 102, an incoming call is received by a telecommunication-enabled device. Consider the situation wherein, for example, a user of a telecommunication-enabled device, such as a mobile telephone, receives an incoming telecommunication request (e.g., telephone call). When a telecommunication request is received by a telecommunication-enabled device, a connection is usually established between the dialing telecommunication-enabled device and the receiving telecommunication-enabled device. The connection is usually handled by the operating system of the telecommunication-enabled device. In an embodiment, a phishing call filtering module may be hooked onto the operating system.

At a next step 104, a determination is made to determine if the unique identifications (e.g., telephone numbers) associated with the incoming telecommunication request is stored on a set of contact lists. The set of contact lists may be a database/list of unique identifications (e.g., telephone numbers). The set of contact lists is accessible by the telecommunication-enabled device. In an example, the set of contact lists may be stored on the telecommunication or a memory card.

If the unique identification associate with the incoming telecommunication request is one of the stored unique identifications, at a next step 106, the user of the telecommunication-enabled device is notified about the incoming telecommunication request. Different notification methods may be employed, such as triggering a telephone ringer, activating the caller ID feature, and the like. As can be appreciated from the foregoing, the comparison may be an event that the operating system of the telecommunication-enabled device may already be performing. In an example, if a telecommunication-enabled device has a caller ID feature, the operating system may already compare the unique identification associated with the incoming telecommunication request to an address book accessible by the recipient's telecommunication-enabled device to determine the identification of the caller. Thus, additional time may not be required to perform the comparison.

In the prior art, if a unique identification is not on the set of contact lists (e.g., white list), the incoming telecommunication request may be blocked and the recipient may remain ignorant of the incoming call. In other words, if the telephone number, for example, is not stored on the white list, the filtering method usually may have no additional procedure for differentiating a valid incoming telephone call, for example, from a potential phishing call. Thus, the prior art white list filtering method may produce a high false positive since some of the incoming telecommunication requests that may be received by the telecommunication-enabled device may be non-phishing calls (i.e., valid telecommunication requests).

In comparison, instead of automatically blocking the incoming telecommunication request, at a next step 108, notification delay may be employed, in an embodiment. In other words, for a short period of time (e.g., one to two seconds) the telecommunication-enabled device may behave as though no incoming telecommunication request has been received. In an example, the telecommunication-enabled device ringer and/or caller ID feature are not activated.

At a next step 110, a determination may be made on the status of the incoming telecommunication request. In an example, the phishing call filtering module may check the connection of the incoming telecommunication request and determine if the connection has been terminated.

If the communication channel for the incoming telecommunication request is still active, at next step 106, the user of the telecommunication-enabled device may be notified (e.g., via a telephone ring). In other words, if the connection has not been terminated, the incoming telecommunication request is considered a valid incoming telecommunication request since the connection established by most potential phishing call is generally terminated by the caller within a short period of time (e.g., about one to two seconds).

However, if the communication channel for the incoming telecommunication request has been terminated, at a next step 112, the incoming telecommunication request is filtered and logged. In other words, if the caller has terminated the call, the incoming call is considered as a potential phishing call and the details about the incoming telecommunication request is logged onto a phishing call log, in an embodiment. Since the incoming telecommunication request is considered as a potential phishing call, the ringer, for example is not activated. Additionally or alternatively, the incoming telecommunication request may not be logged as a missed call. As can be appreciated from the foregoing, the user of the telecommunication-enabled device may access the phishing call log to review the potential phishing call. In an embodiment, the user of the telecommunication-enabled device may configure the telecommunication-enabled device to include a notification when the phishing call log is updated.

As can be appreciated from FIG. 1, a simple phishing call filtering method may be employed to determine a potential phishing call. The phishing call filtering method may utilize a set of contact lists (e.g., white lists) to quickly determine a valid incoming telecommunication request. Unlike the prior art, the incoming telecommunication request is not automatically discarded if the unique identification associated with the incoming telecommunication request is not stored on the set of contact lists. Instead, the phishing call filtering method includes a differentiation method that exploits a characteristic that tends to be common to phishing calls, i.e., the short duration of an active phishing call. As a result, the phishing call filtering method provides a simple and inexpensive method for protecting the user of the telecommunication-enabled device from potential phishing calls without inconveniencing the user.

Figure 2:
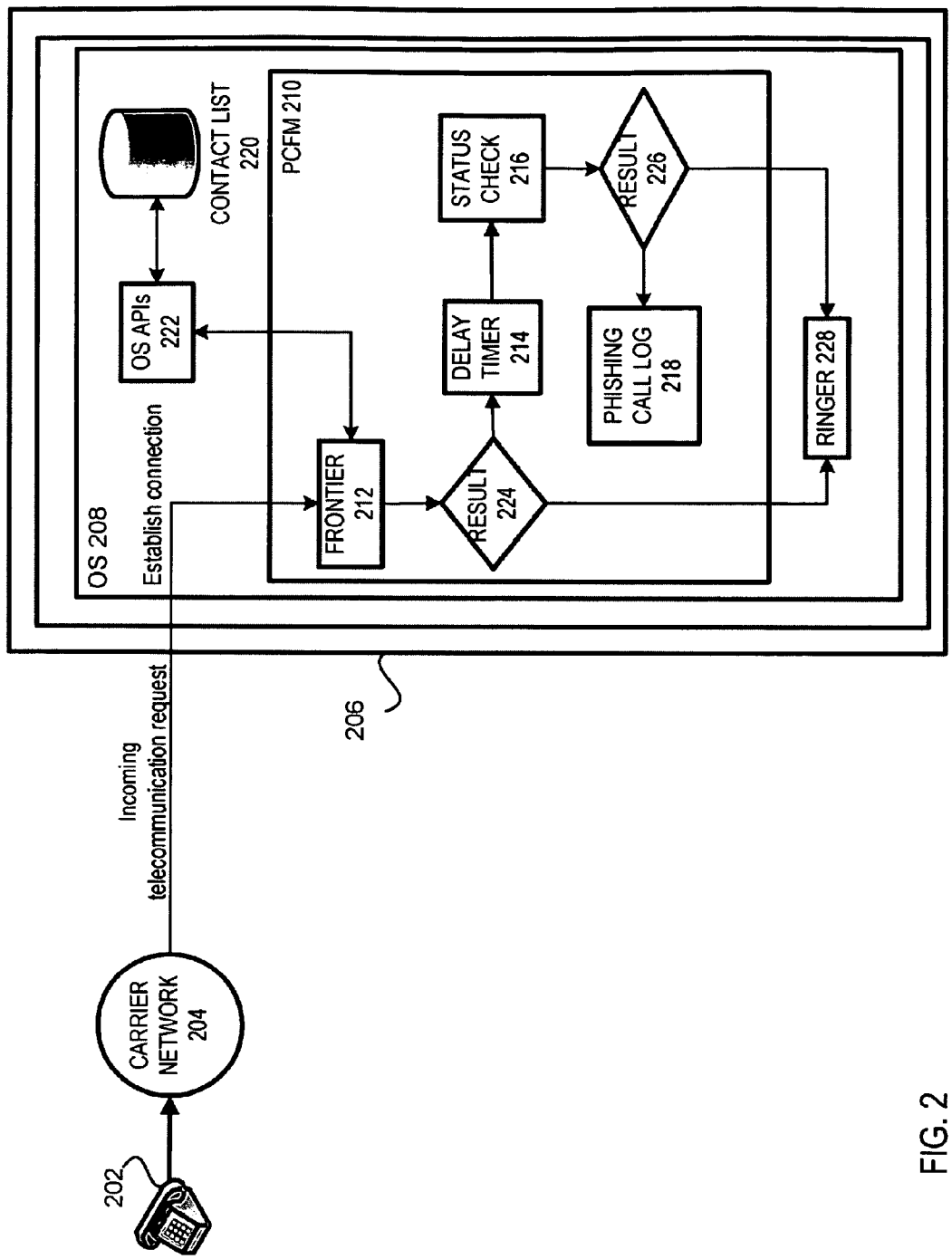
FIG. 2 shows, in an embodiment of the invention, a simple overall block diagram of a phishing call filtering module.
Figure 3:
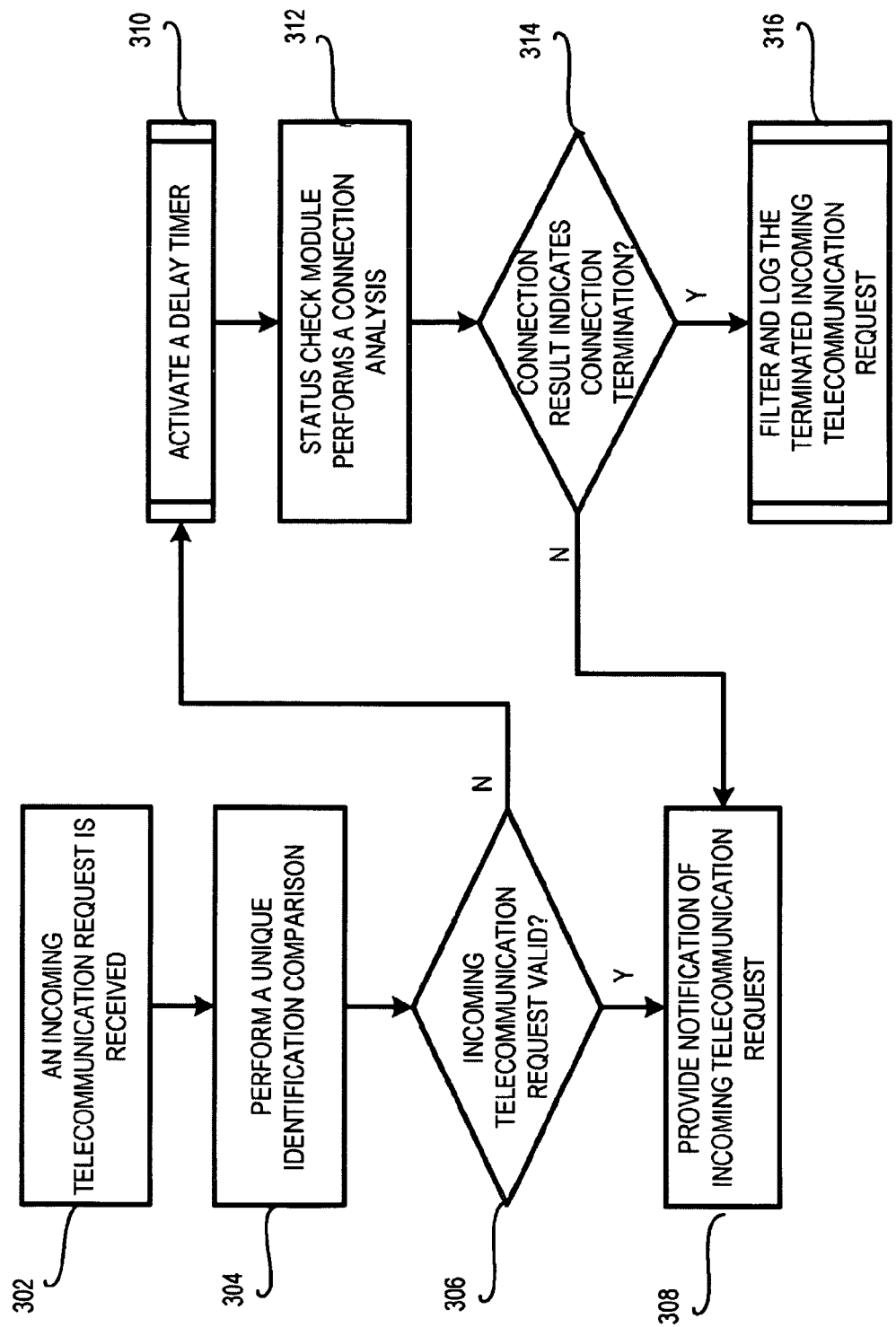
FIG. 3 shows, in an embodiment of the invention, a simple flow chart illustrating the algorithm for performing phishing call filtering method.

FIG. 2 shows, in an embodiment of the invention, a simple overall block diagram of a phishing call filtering module. To facilitate discussion, FIG. 2 will be discussed in relation to FIG. 3, which is a simple flow chart illustrating the algorithm for performing phishing call filtering method, in an embodiment.

At a first step 302, an incoming telecommunication is received. Consider the situation wherein, for example, a caller using a telecommunication-enabled device 202 (e.g., telephone) calls a user of a telecommunication-enabled device 206. The telecommunication request may travel through a network, such as a carrier network 204, to connect with telecommunication-enabled device 206. The incoming telecommunication request may be received by an operating system 208. In an embodiment, a phishing call filter module (PCFM) 210 may be hooked into operating system 208.

In an embodiment, phishing call filtering module 210 may be configured to manage incoming telecommunication sessions (e.g., telephone calls). Phishing call filtering module 210 may be implemented as a software application, a hardware component, and/or a firmware application. In an example, as a software application, phishing call filtering module 210 may be downloaded onto telecommunication-enabled device 206 (e.g., mobile device, cellular telephone, smart device, computer, internet protocol telephone, landline telephone, etc.), thereby enabling telecommunication-enabled device 206 to filter incoming phishing calls. In another example, phishing call filtering module 210 may be a hardware component that may be added to telecommunication-enabled device 206 to enable the telecommunication-enabled device to manage incoming calls. In an embodiment, phishing call filtering module 210 may include a frontier module 212, a delay timer 214, a status check module 216, and a phishing call log 218.

At a next step 304, a unique identification comparison is performed. As can be appreciated from the foregoing, the operating system of most telecommunication-enabled device may have a caller ID feature that enables a name to be displayed for an incoming telecommunication request. To enable the caller ID feature, operating system 208 may access a set of contact lists (e.g., address book), which is a database/list of contact numbers stored on telecommunication-enabled device 206, to identify the name of the caller. As can be appreciated from the foregoing, an example of a contact list may be the address book stored on the telecommunication-enabled device. Additionally or alternatively, another example of a contact list may be an additional list that may be stored on the telecommunication-enabled device or a memory card associated with the telecommunication-enabled device. Regardless of the storage location of the set of contact lists, frontier module 212 is configured to perform a comparison of the unique identification associated with an incoming telecommunication request against one or more contact lists to determine if the incoming telecommunication request is a valid telecommunication request. The result (224) from the comparison may be employed by phishing call filtering module 210 to quickly rule out the possibility of a phishing call.

To access the result, frontier module 212 may be connected to a set of operating system application programming interfaces (APIs) 222. In an embodiment, frontier module 212 may be configured, in an embodiment, to call operating system APIs 222 to compare the unique identification associated with the incoming telecommunication request (e.g., telephone call) against a set of contact lists 220. However, if the telecommunication-enabled device include proprietary software that prevent frontier module 212 from hooking onto operating system APIs 222, frontier module 212 may be configured to perform the unique identification comparison, in an embodiment.

At a next step 306, frontier module 212 may analyze result 224 to determine the validity of the incoming telecommunication request.

In an example, if the telephone number associated with incoming telecommunication request is stored on set of contact lists 220, the incoming telecommunication request is considered as a valid telecommunication request. At a next step 308, the user is notified via a set of user notification components (e.g., ringers, caller ID, etc.) of the incoming telecommunication request. As discussed herein, set of user notification components may include any notification that can be perceived by the user of the telecommunication-enabled device. Notification may include activating a ringer 228. Additionally, the identification of the caller may be visually displayed and/or orally announced. If the user is not available to respond to the incoming telecommunication request, the incoming telecommunication request is reported as a missed call.

However, if the unique identification associated with the incoming telecommunication request is not stored on set of contact lists 220, the incoming telecommunication request is not immediately discarded. In an example, result 224 returns an "unknown". Additional analysis may be performed. To provide data for the analysis, delay timer may be activated, at a next step 310. In an embodiment, delay timer 214 is a counter that may be configured to stop after a pre-defined counter number has been reached. In another embodiment, delay timer 214 may be set at the desired countdown period and the countdown is triggered if a condition, such as a return result 224 of "unknown" is provided.

As aforementioned, most phishing calls are relatively short. A phishing call may usually last long enough to notify a user of the telecommunication-enabled device of the incoming telecommunication request but is usually terminated before the user is able to respond to the incoming telecommunication request. As a result, most phishing calls tend to last about one to two seconds. In an embodiment, delay timer 214 may be set to a predefined period of time (e.g., one to two seconds). As can be appreciated from the foregoing, delay timer 214 is a configurable component and may be modified by the user of the telecommunication-enabled device.

Once delay timer 214 has completed its task, at a next step 312, status check module 216 may perform a connection analysis. In other words, status check module 216 may check the connection established as a result of the incoming telecommunication request.

At a next step 314, a determination is made by status check module 216 about a connection result 226.

If connection result 226 indicates that the connection established by incoming telecommunication request is still active, than at step 308, the user of the incoming telecommunication request is notified.

However, if connection result 226 indicates that the connection established by incoming telecommunication request has been terminated, than at a next step 316, the connection established by incoming telecommunication request may be terminated since the incoming telecommunication request is identified as a potential phishing call. Since the incoming telecommunication request has been terminated, the user is not notified of the terminated telecommunication request. In other words, the set of user notification components is not activated. In an example, ringer 228 is not triggered. In another example, the caller ID feature of the telecommunication device, if available, is not activated either.

In an embodiment, the details about the potential phishing call may be saved onto phishing call log 218. In an embodiment phishing call log 218 may be a database/list stored on telecommunication-enabled device 206 and/or a memory card of telecommunication-enabled device 206. Data stored about the potential phishing call may include, but are not limited to, the unique identification associated with the potential phishing call, the time of the incoming telecommunication request, and the like. In an embodiment, phishing call log 218 is configurable, thereby enabling the user of telecommunication-enabled device 206 to select the type of data phishing call log 218 may include. Additionally or alternatively, the user of telecommunication-enabled device 206 may also configure the type of update notification (e.g., ring, buzz, music, etc.) that may be triggered when phishing call log 218 has been updated. Thus, with phishing call log 218, the user of telecommunication-enabled device 206 has the option of reviewing phishing call log 218 at his convenience. Since the user of telecommunication-enabled device 206 is now provided with a list of potential phishing calls, the user is provided with the data necessary to make a conscious decision about returning a call.

As can be appreciated from one or more embodiments of the invention, the phishing call filtering methods and arrangement are a simple but elegant solution for positively identifying phishing calls. The methods and arrangement do not require the onerous or tedious task of maintaining and updating a black list that may be constantly changing. With the methods and arrangement, potential phishing calls may be identified based on characteristics, which are commonly associated with a phishing call. Since the filtering is based off of the inherent differences in the behavior of a phishing call versus a valid telecommunication request, the phishing call filtering methods and arrangement may significantly increase detection rate. Also, since the phishing call filtering module is configured to not automatically filter out incoming telecommunication request based solely on a white list, the high false positive that has been associated with the prior art white list filtering method may also be substantially reduced. Therefore, phishing call detection rate may be significantly increased without inconveniencing the user of the telecommunication-enabled device and without incurring a significant overhead cost.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for managing a phishing call for a telecommunication enabled-device, comprising:
   receiving an incoming telecommunication request for the telecommunication enabled-device;
   comparing a unique identification associated with said incoming telecommunication request against a set of contact lists;
   if said unique identification is not found on said set of contact lists, activating a delay timer, said delay timer being configured to prevent a set of user notification components from being triggered for a delay period;
   performing a connection analysis to determine status of said incoming telecommunication request; and
   if said incoming telecommunication request is terminated during said delay period, updating a phishing call log with data about said incoming telecommunication request, wherein said updating of said phishing call log occurs without said set of user notification components being triggered, responsive to said incoming telecommunication request, during or subsequent to said updating,
   wherein said managing of said phishing call is performed by a phishing call filtering module that includes at least a frontier module, said delay timer, a status check module, and said phishing call log, and
   wherein said comparing said unique identification associated with said incoming telecommunication request to said set of contact lists is managed by said frontier module, wherein said frontier module is configured to be coupled to an application programming interface (API) of an operating system of a telecommunication-enabled device receiving said incoming telecommunication request.

2. The method of claim 1 wherein said delay timer is configurable.

3. The method of claim 1 wherein said delay period set for said delay timer is two seconds.

4. The method of claim 1 wherein said delay period set for said delay timer is one second.

5. The method of claim 1 wherein said status check module is configured for at least performing said connection analysis.

6. The method of claim 5 wherein said phishing call log is configurable.

7. The method of claim 6 wherein an update notification component is activated when said phishing call log is updated.

8. The method of claim 1 further including
   if said incoming telecommunication request is not terminated during said delay period, activating said set of user notification components, thereby enabling notification to a user of said call.

9. A phishing call filtering arrangement for managing a call, said arrangement being implemented within a telecommunication-enabled device, comprising;
   a frontier module, said frontier module being configured for performing a unique identification comparison between a unique identification of a telecommunication device that originates said call and a set of contact lists;
   a delay timer, said delay timer being configured for at least preventing a set of user notification components from being triggered for a delay period after said call is received by said telecommunication-enabled device if said unique identification of said telecommunication device that originates said call is not found in said set of contact lists;

a status check module, said status check module being configured for performing a connection analysis on said call; and a phishing call log, said phishing call log being configured for at least storing data about said call if said call is terminated during said delay period, said storing said data about said call occurs without said set of user notification components being triggered during or subsequent to said storing, wherein said call includes an incoming telecommunication request and wherein said frontier module is configured to be coupled to an application programming interface (API) of an operating system of said telecommunication-enabled device.

10. The arrangement of claim 9 wherein said set of contact lists include a white list.

11. The arrangement of claim 9 wherein said set of contact list include an address book.

12. The arrangement of claim 9 wherein said connection analysis includes determining connection status of said call.

13. The arrangement of claim 12 wherein said phishing call log is updated if said connection analysis of a connection of said call provides a terminated status.

14. The arrangement of claim 13 wherein said phishing call log is configurable.

15. The arrangement of claim 14 wherein an update notification component is activated when said phishing call log is updated.

16. The arrangement of claim 9 wherein said delay timer is activated if said unique identification associated with said call is not stored on said set of contact lists.

17. The arrangement of claim 16 wherein said delay period set for said delay timer is two seconds.

* * * * *